United States Patent
Johnson et al.

(10) Patent No.: US 11,996,804 B2
(45) Date of Patent: *May 28, 2024

(54) PHOTOVOLTAIC MODULE OR ARRAY SHUTDOWN

(71) Applicant: SunPower Corporation, Santa Jose, CA (US)

(72) Inventors: Benjamin Alexander Johnson, Fremont, CA (US); Andrew Joseph Ponec, Salem, OR (US)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,892

(22) Filed: Jul. 28, 2022

(65) Prior Publication Data

US 2022/0368281 A1    Nov. 17, 2022

Related U.S. Application Data

(63) Continuation of application No. 17/223,953, filed on Apr. 6, 2021, now Pat. No. 11,437,953, which is a
(Continued)

(51) Int. Cl.
| | |
|---|---|
| *H02J 3/38* | (2006.01) |
| *H02S 40/32* | (2014.01) |
| *H02S 40/34* | (2014.01) |
| *H02S 50/00* | (2014.01) |
| *H02S 50/10* | (2014.01) |

(52) U.S. Cl.
CPC .............. *H02S 40/34* (2014.12); *H02S 40/32* (2014.12); *H02S 50/00* (2013.01); *H02S 50/10* (2014.12); *H02J 2300/24* (2020.01)

(58) Field of Classification Search
CPC ............ H01L 31/02021; H01L 31/042; H01L 31/0504; H02J 3/383; H02J 2300/24; H02J 2300/26; H02S 40/32; H02S 40/34; H02S 40/36; H02S 50/00; H02S 50/10; Y02E 10/50; Y02E 10/56
See application file for complete search history.

(56) References Cited

U.S. PATENT DOCUMENTS

| | | |
|---|---|---|
| 3,982,105 A | 9/1976 | Eberle |
| 4,873,480 A | 10/1989 | Lafferty |
| | (Continued) | |

FOREIGN PATENT DOCUMENTS

| | | |
|---|---|---|
| FR | 2894401 A1 | 6/2007 |
| JP | H11332088 A | 11/1999 |
| | (Continued) | |

OTHER PUBLICATIONS

Third Office Action from Chinese Patent Application No. 2015800505140 dated Mar. 26, 2020, 4 pgs.
(Continued)

*Primary Examiner* — Levi Gannon
(74) *Attorney, Agent, or Firm* — Banner & Witcoff, Ltd.

(57) ABSTRACT

A photovoltaic (PV) system can include a plurality of PV modules and circuitry configured to receive an indication of a status of the PV system and to, in response to the indication, determine whether to switch between a first state in which the PV modules output DC power and a second state in which the PV modules do not output power.

16 Claims, 5 Drawing Sheets

Related U.S. Application Data continuation of application No. 14/748,038, filed on Jun. 23, 2015, now Pat. No. 10,992,255.

(60) Provisional application No. 62/069,784, filed on Oct. 28, 2014.

(56) References Cited

U.S. PATENT DOCUMENTS

| | | | |
|---|---|---|---|
| 5,054,023 | A | 10/1991 | Kronberg |
| 5,406,249 | A | 4/1995 | Pettus |
| 6,093,885 | A | 7/2000 | Takehara et al. |
| 7,426,099 | B2 | 9/2008 | Soudier et al. |
| 8,013,472 | B2 | 9/2011 | Adest et al. |
| 8,126,991 | B2 | 2/2012 | Smith et al. |
| 8,365,018 | B2 | 1/2013 | McIntosh et al. |
| 8,519,560 | B2 | 8/2013 | Ito |
| 8,531,055 | B2 | 9/2013 | Adest et al. |
| 8,624,436 | B2 | 1/2014 | Willis |
| 8,816,535 | B2 | 8/2014 | Adest et al. |
| 9,071,339 | B2 | 6/2015 | Oldenkamp |
| 9,088,178 | B2 | 7/2015 | Adest et al. |
| 9,225,285 | B2 | 12/2015 | Peurach et al. |
| 9,680,301 | B2 | 6/2017 | Johnson et al. |
| 9,742,194 | B2 | 8/2017 | Orr et al. |
| 9,865,411 | B2 | 1/2018 | Friebe et al. |
| 2002/0014262 | A1 | 2/2002 | Matsushita et al. |
| 2002/0118559 | A1 | 8/2002 | Kurokami et al. |
| 2008/0150366 | A1 | 6/2008 | Adest et al. |
| 2009/0097283 | A1 | 4/2009 | Krein et al. |
| 2009/0121549 | A1 | 5/2009 | Leonard |
| 2009/0190275 | A1 | 7/2009 | Gilmore et al. |
| 2010/0286836 | A1 | 11/2010 | Shaver, II et al. |
| 2011/0088741 | A1 | 4/2011 | Dunton et al. |
| 2011/0204900 | A1 | 8/2011 | Beck |
| 2011/0273302 | A1 | 11/2011 | Fornage et al. |
| 2012/0025621 | A1 | 2/2012 | Seymour et al. |
| 2012/0048325 | A1 | 3/2012 | Matsuo et al. |
| 2012/0158200 | A1 | 6/2012 | Vandevelde et al. |
| 2012/0326511 | A1 | 12/2012 | Johnson |
| 2013/0058140 | A1 | 3/2013 | Victor et al. |
| 2013/0113293 | A1 | 5/2013 | Elpel |
| 2013/0175971 | A1 | 7/2013 | Har-Shai et al. |
| 2013/0200710 | A1 | 8/2013 | Robbins |
| 2014/0121849 | A1 | 5/2014 | Ansari et al. |
| 2014/0168835 | A1 | 6/2014 | Fornage |
| 2016/0079752 | A1 | 3/2016 | Matan et al. |

FOREIGN PATENT DOCUMENTS

| | | |
|---|---|---|
| WO | 2005027300 A1 | 3/2005 |
| WO | 2008/077473 A2 | 7/2008 |
| WO | 2010078303 A2 | 7/2010 |
| WO | 2014169292 A2 | 10/2014 |

OTHER PUBLICATIONS

Rejection Decision from Chinese Patent Application No. 015800505140 dated Oct. 21, 2019, 8 pgs.
Official Communication from European Patent Application No. 15854484.1 dated Jun. 25, 2019, 4 pgs.
Second Office Action from Chinese Patent Application No. 2015800505140 dated May 7, 2019, 8 pgs.
First Office Action from Chinese Patent Application No. 2015800505140 dated Sep. 11, 2018, 10 pgs.
Official Communication from European Patent Application No. 15854484.1 dated Feb. 26, 2018, 3 pgs.
International Search Report and Written Opinion from PCT/US2015/056776 dated Feb. 11, 2016, 13 pgs.
International Preliminary Report on Patentability from PCT/US2015/056776 dated May 11, 2017, 10 pgs.
First Action Interview Pre-Interview Communication from U.S. Appl. No. 14/748,038 dated Oct. 11, 2017, 26 pgs.
First Action Interview Office Action from U.S. Appl. No. 14/748,038 dated Jan. 18, 2018, 28 pgs.
Final Office Action from U.S. Appl. No. 14/748,038 dated Apr. 23, 2018, 22 pgs.
Non-Final Office Action from U.S. Appl. No. 14/748,038 dated Aug. 29, 2018, 21 pgs.
Final Office Action from U.S. Appl. No. 14/748,038 dated Dec. 28, 2018, 13 pgs.
Non-Final Office Action from U.S. Appl. No. 14/748,038 dated Apr. 24, 2019, 13 pgs.
Final Office Action from U.S. Appl. No. 14/748,038 dated Jul. 31, 2019, 15 pgs.
Non-Final Office Action from U.S. Appl. No. 14/748,038 dated Dec. 13, 2019, 15 pgs.
Final Office Action from U.S. Appl. No. 14/748,038 dated Feb. 28, 2020, 14 pgs.
Non-Final Office Action from U.S. Appl. No. 14/748,038 dated Sep. 8, 2020, 15 pgs.
Non-Final Office Action from U.S. Appl. No. 17/223,953 dated Jan. 25, 2022, 7 pgs.
H. Iben, et al. "Watchdog Designs for TinyOS Motes," University of California at Berkeley, May 16, 2002.

PHOTOVOLTAIC MODULE OR ARRAY SHUTDOWN

CROSS-REFERENCE TO RELATED APPLICATIONS

This application is a Continuation of U.S. patent application Ser. No. 17/223,953, filed on Apr. 6, 2021, which is a Continuation of U.S. patent application Ser. No. 14/748,038, filed on Jun. 23, 2015, now U.S. Pat. No. 10,992,255, issued on Apr. 27, 2021, which claims the benefit of U.S. Provisional Application No. 62/069,784, filed Oct. 28, 2014, the entire contents of which are hereby incorporated by reference herein.

BACKGROUND

Solar cells can be connected in series to form a photovoltaic ("PV") module. A plurality of PV modules can be coupled together to form a PV array. In a PV array, it can be useful to temporarily disable one or more PV modules such that the voltage produced by the module and/or by the array as a whole is below a threshold (e.g., safety, regulatory). Such a temporary disablement can be referred to as safety shutdown and can facilitate installation, maintenance, and/or emergency work (e.g., firefighting) on the array or nearby structures.

DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" state of operation of a PV module does not necessarily imply that this state is the first state in a sequence; instead the term "first" is used to differentiate this state from another state (e.g., a "second" state).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

This specification first describes structures for shutting down and starting up PV modules followed by an example method for performing shut down and start up. Various examples are provided throughout.

Figure 1:
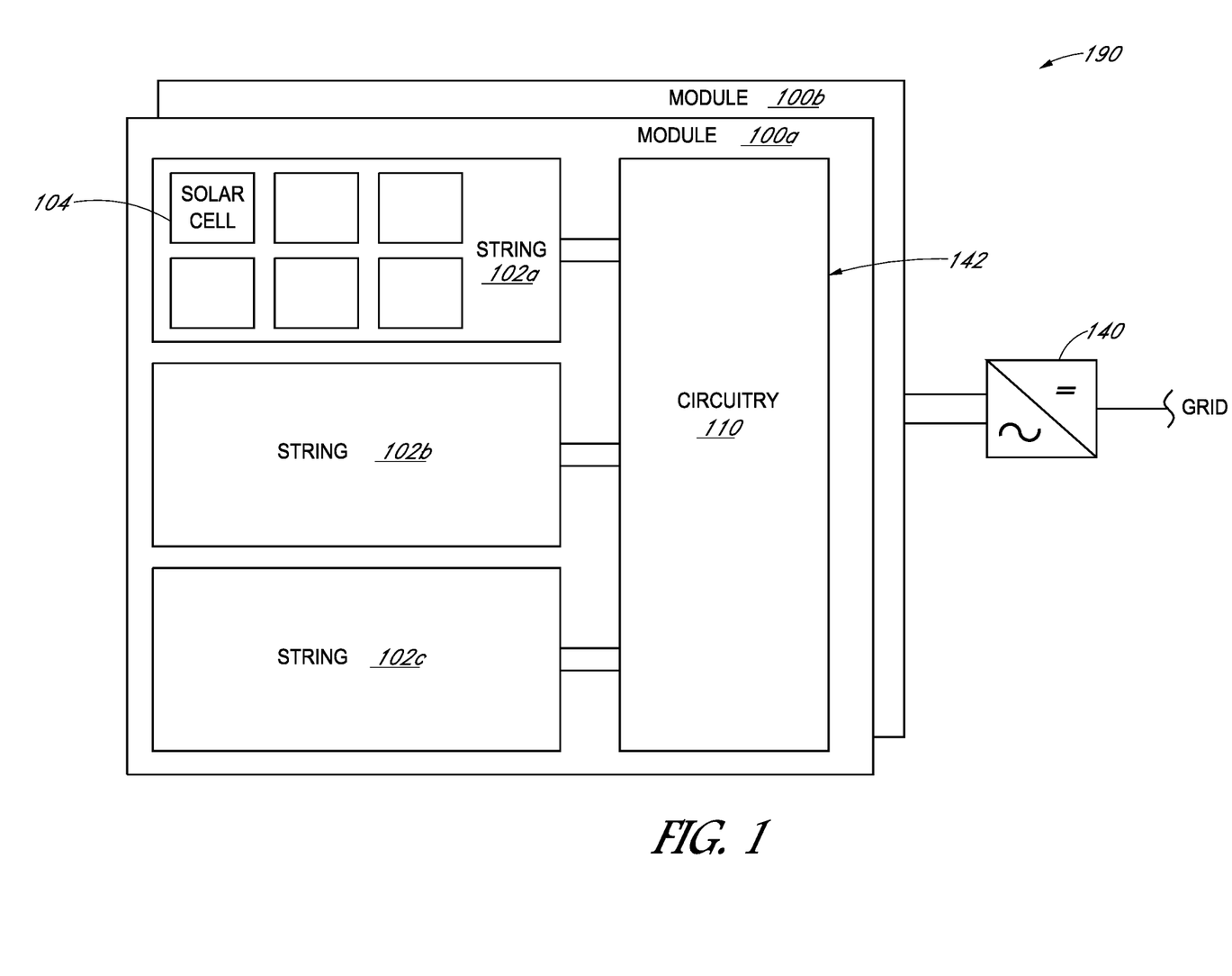
FIG. 1 illustrates an example system configured to shut down or start up a photovoltaic module, according to some embodiments.

Turning now to FIG. 1, a PV system configured to perform shut down and start up is illustrated. In the illustrated embodiment, PV system 190 includes a plurality of PV modules, such as PV modules 100a and 100b. Each PV module can be subdivided into several groupings of solar cells, referred to as cell strings, such as strings 102a, 102b, and 102c. Cell strings can include a plurality of series-connected solar cells, for example, 10-40 individual series-connected solar cells (e.g., solar cell 104). Generally speaking, the number of solar cells in a string, and the number of strings in a PV module, determines the voltage produced by the string and PV module, respectively. Although the example PV module of FIG. 1 illustrates three strings of solar cells, in other embodiments, a different number of strings can be coupled in series in a PV module.

Also as shown in the illustrated embodiment, the PV module includes or is otherwise associated with circuitry 110. In one embodiment, circuitry 110 can be configured to receive an indication, such as indication 142, of the status of the PV system and can also be configured to determine (e.g., based on the indication) whether to switch between an enabled state in which the PV module's output voltage and power includes voltage and power from all of the plurality of solar cells (e.g., each string) and a disabled state in which the PV module is disabled. A PV module can be considered disabled when it outputs substantially no DC power or voltage thereby bypassing the strings from substantially providing voltage to the PV module's output voltage, and vice versa. A PV module operating in the disabled state can be referred to as a disabled or shut down PV module. Placing the PV module in the disabled state is referred to herein as shutting down or disabling the PV module. A PV module operating in the enabled state is referred to herein as an active PV module and placing the PV module in the enabled state from the disabled state is referred to herein as starting up the PV module.

In various embodiments, indication 142 of the status of the PV system can be received by circuitry 110 from a number of different sources. For example, indication 142 can be provided by an inverter, such as inverter 140, from a sensor within PV module 100a and/or circuitry 110, or from some other component outside of PV module 100a. As described in more detail below, the indication can be a shutdown indication, a heartbeat indication, a startup indication, a time-varying light indication, a vibration indication, a parameter measured by the circuitry or other component, among other examples.

Figure 5:
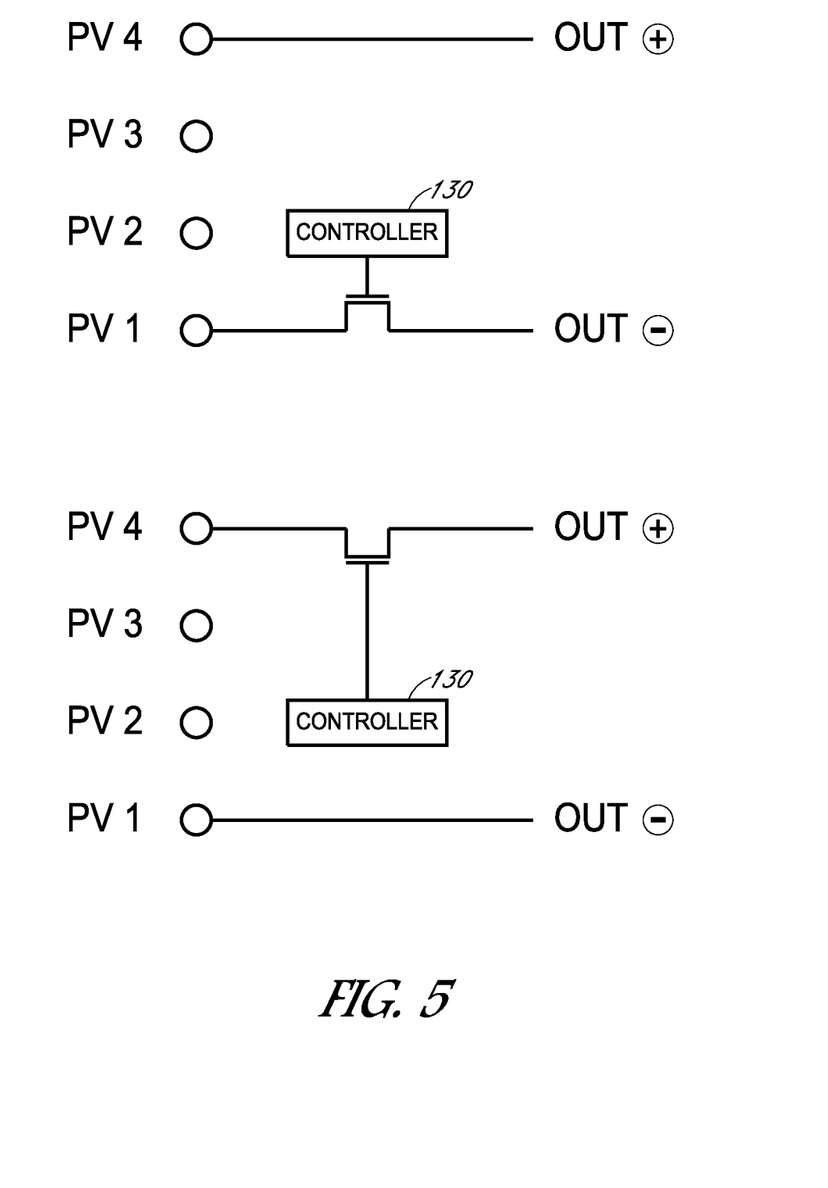
FIG. 5 illustrates an example diagram of circuitry configured to disable a PV module or string by opening one or more switches in series, according to some embodiments.

In one embodiment and as illustrated in FIG. 5, circuitry 110 can be configured to disable the PV module by opening one or more switches in series with one or more of the PV module's output connections or cell string connections hereby disconnecting the module's cells from the rest of the array and/or by closing one or more switches (shorting) in parallel with the module or sections of the module thereby reducing the voltage to a small level while leaving the panel connected to the load. As shown in FIG. 5, PV1-PV4 represent connections to a module's cell-strings. A series FET or other switch can be opened by controller 130 to disable at the cell string connection indicated by PV1 and PV4. In various embodiments, a switch can be located at the negative line of the cell string connection (top portion of FIG. 5) or at the positive line of the cell string connection (bottom portion of FIG. 5). Although FIG. 5 only illustrates a single switch configuration, in some embodiments, more than one switch can be used.

Turning back to FIG. 1, as one specific example, circuitry 110 can be a voltage limiting device and, in one embodiment, can include a parallel current path provided across each cell string such that the output of the respective cell string can be included or excluded from the output of the PV module, for example, based on the configuration of one or more switches. The parallel current path can be configured to lower the total impedance on the cell string's output, which can lower the generated voltage of the PV module. In other embodiments, the parallel current path can be provided across the entire PV module, a plurality of cells, a plurality of strings, or plurality of modules, to achieve a similar effect. For shutdown of an entire PV module, for instance, as would be used in a safety shutdown application, the parallel current path can be provided across the entire PV module.

Circuitry 110 can be located at or in the PV module in a number of ways. In various embodiments, circuitry 110 can be in an enclosure (e.g., junction box or other enclosure) attached and wired to the module, in a removable electronics module where the PV module's connections are protected from inadvertent contact when the electronics module is not present, or installed in the module, for instance, as part of the lamination process. In some instances, the components of circuitry 110 described herein can be distributed. For example, some components can reside in the junction box and others can reside remote from the module.

Note that in some embodiments, instead of circuitry 110 being located in a junction box, one or more components of the overvoltage protection device can be located in other locations, such as in the encapsulation of the PV module, or external to the PV module.

In embodiments, the output of the PV modules can be coupled to inverter 140, which can be configured to convert the direct current (DC) output from the PV modules to alternating current (AC) to provide to the grid.

Figure 2:
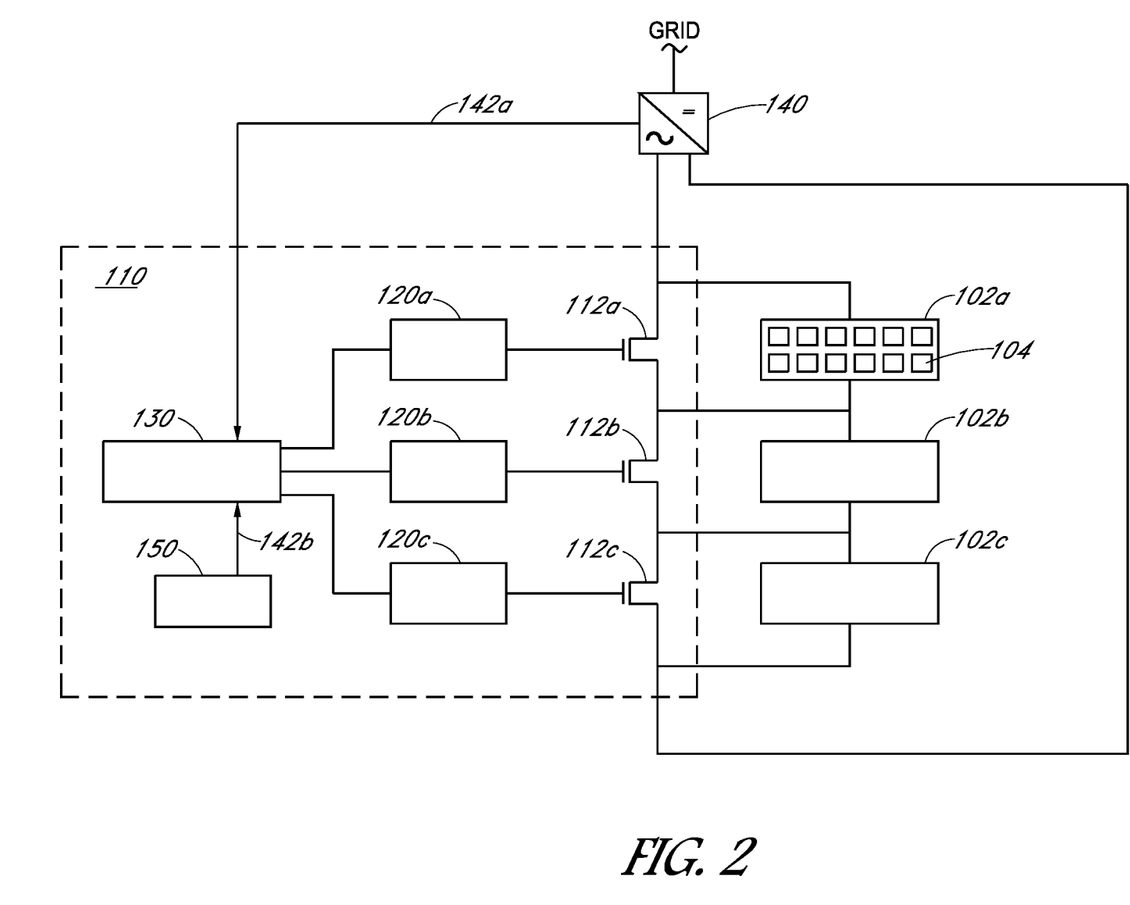
FIG. 2 illustrates example circuitry configured to shut down or start up photovoltaic modules, according to some embodiments.

Turning now to FIG. 2, example circuitry configured to implement shut down or startup of one or more PV modules is illustrated, according to some embodiments. As shown, circuitry 110 can includes one or more switches, such as switches 112a, 112b, and 112c. Although the illustrated circuitry includes three switches, one switch per string of solar cells, in other examples, a single switch can be used per PV module.

In one embodiment, a parallel current path can be implemented, using a switch or switches, such as relays, field effect transistors (FETs), bipolar junction transistors (BJT), insulated-gate bipolar transistors (IGBT), micro electro mechanical system (MEMS) relay, or other switching mechanisms that can be switched between a low-resistance state and a high-resistance state. In the parallel current path example, the solar cells of a module can be shorted (e.g., bypassed) by closing the switch or switches (e.g., switch 112a, 112b, and 112c) across the PV module to enable the parallel current path. Switches are illustrated in FIG. 2 as FETs 112a, 112b, and 112c. As noted above, in another embodiment, a different number of switches (e.g., one) other than three can be implemented to bypass or enable the module in other embodiments.

In one embodiment, circuitry 110 can include an analog or digital controller 130 configured to provide an indication to driver 120 or drivers, such as drivers 120a, 120b, and 120c (as illustrated), which can be configured to turn on (e.g., enable, engage, close, activate) the switch(es) to short a cell string or entire module thereby reducing the voltage contribution from that cell string to approximately zero volts. As used herein, driver 120 can be circuitry (e.g., one or more transistors) configured to level shift the controller 130 output to command the switch to turn on or off. Although the switching is described as being performed on an entire cell string, in some embodiments, switching can be performed at the module level, at the cell level, or in some combination of cell level, string level, and/or module level.

In one embodiment, the switches and controller can be located on the same printed circuit board. The switches and controller can be assembled on a rigid or flexible printed circuit board or other substrate, such as low-temperature co-fired ceramic, suitable for electrical connections and mechanical support of the components. Some components of the circuitry may be mounted separately on conductors that are part of the PV module assembly such as bus bars or terminals, and may be electrically connected to the conductor and/or to other circuitry by soldering, welding, brazing, crimping, wire bonding, or a combination of those methods.

In various embodiments, controller 130 (analog or digital) can be implemented using hardware, firmware, software, or some combination thereof. In various embodiments, controller 130 can include one or more of a microprocessor or microcontroller, program memory, data memory, associated logic, a programmable logic device, and/or non-programmable circuitry.

In some embodiments, the circuitry can include a built-in test (BIT) facility that includes circuitry and/or program code that is configured to test the device, in whole or in part, for proper operation. The BIT facility can be configured to detect certain malfunctions and can cause the device to take action to limit the hazards or damage that may be caused by such malfunctions. Such actions can include disabling the module, or preventing the module from being disabled, permanently or until it can be repaired.

In some embodiments, circuitry 110 can include a power supply, which can be configured to provide power to the components of circuitry 110. The power supply can be configured to convert part of the power available from the module, from part of the module, or from the module's connection to the PV array into a voltage and current suitable for operating circuitry 110. By using power from the module's connection to the PV array, the power supply can operate even if the PV module does not produce sufficient power on its own, such as at night In one embodiment, controller 130 can be configured to receive indication 142 of the status of the PV system and determine whether to enable or disable the PV modules, for example by turning off the parallel path (e.g., opening, disabling, disengaging, deactivating) or engaging the parallel path to short the cells, respectively.

As described herein, the indication of the status of the PV system can be a variety of different indications. For instance, the indication can be a heartbeat or startup indication from inverter 140 as shown by indication 142a. As another example, indication 142b can be measured by sensor 150 and can be provided to controller 130. Examples of indication 142b include a vibration measurement, a voltage or current measurement, among other examples.

As described herein, in various embodiments, indication 142 of the status of the PV system can be received by circuitry 110 from inverter 140 as indication 142a, from sensor 150 within PV module 100a or circuitry 110, or from some other component outside of PV module 100a. For example, indication 142b can be measured by sensor 150 and provided to controller 130. For instance, sensor 150 can be configured to sense the PV module's and/or PV array's performance (e.g., voltage across the module, current through the module), vibration measurement, and/or temperature at one or more locations on the module or in the circuitry, among other examples. Note that such performance measurements can also be used for the BIT facility.

As another example, indication 142a can be received by controller 130 from a component outside of circuitry 110, such as from inverter 140 or some other component. For example, inverter 140 can provide an indication that is an explicit shutdown command or a heartbeat indication, among other examples.

In various embodiments, controller 130 can include a transceiver configured to receive data or a command from a component outside the PV module and/or to send information, such as measurements and/or identifying information (e.g., GPS data, RFID data), to the outside component. In one embodiment, such data, command, or information can be sent through wired or wireless (e.g., ZigBee, mesh network, Wi-Fi, Bluetooth, etc.) communication. In one embodiment, a central component common to multiple PV modules, such as inverter 140, can provide an indication to distributed controllers 130, local to each PV module, to enable or disable the PV modules. In some embodiments, local and central control of enabling and disabling the PV modules can be used together such that a global enabling or disabling can be performed for a subset of the PV modules of an array due to some local condition (e.g., based on local measurements).

In various embodiments, controller 130 can determine to disable the PV module or modules based on results of measurements of the module (e.g., current exceeding a particular level in a particular direction) or based on receiving a shutdown command from a remote device (e.g., inverter 140) or based on failing to receive a periodic command (e.g., heartbeat) to stay enabled. In various embodiments, controller 130 can determine to enable the PV module or modules based on receiving a command from a remote device to become enabled or based on measurements at the module(s).

In some embodiments, a remote device can periodically send an enable command, which can be a heartbeat indication, to some or all the modules in an array instructing them to remain enabled (or become enabled) for a period of time. Should a module not timely receive the heartbeat indication, its controller 130 can determine to disable the PV module and then disable the PV module (e.g., by enabling the parallel current path). In one embodiment, the heartbeat transmitter can be powered by the AC grid, by the inverter's output, or by a separate power source. If the heartbeat transmitter is powered by the inverter's output and the inverter correctly detects disconnection of the AC power grid, then disconnecting the AC power grid at a location remote from the inverter would cause the inverter to shut down, causing the heartbeat transmitter to lose power. The controller or controllers corresponding to the PV modules would fail to receive the heartbeat within the expected period of time to receive the heartbeat and then disable the modules. By doing so, the inverter and some or all modules feeding it can be disabled and stop producing a hazardous voltage without requiring any work to be done near the modules (i.e., service and/or emergency personnel do not have to approach the array to put it into a safe state).

In various embodiments, the heartbeat indication can be provided to the modules in a variety of ways. For example, an electrical signal can be imposed on the array, such as a time-varying current, which can be detected and discriminated from noise or other outside influences by sensing circuitry. As one specific example, power-line communication (PLC) can be used to transmit or receive a variation in the module's voltage or current between the remote device and module. PLC can be used to send a heartbeat indication such that a periodic indication can be sent to multiple modules causing the multiple modules to remain enabled for a predetermined amount of time (e.g., 10 seconds, 15 seconds).

The remote transmitting device can be the inverter, combiner box, or some other component, as described herein. In an embodiment in which the inverter is the device transmitting the heartbeat indication, a specific heartbeat circuit can be included in the inverter to provide the heartbeat or the heartbeat indication can be produced by altering the normal operation of the inverter circuitry.

Examples of variations to the normal operation of the inverter include changing the timing and/or magnitude of maximum power-point tracking (MPPT) steps, causing the array's operating point (and its voltage or current) to vary according to a predetermined pattern (but in a way that has a small effect on the power produced by the inverter), or applying a voltage to the array, even if the array cannot produce usable power (e.g., before sunrise).

For example, a voltage can be applied to the array by adjusting the timing of a three-phase bridge or by connecting a precharge circuit to the array to cause the array's voltage to increase while some or all the modules are disabled. In one embodiment, one particular example is to change the frequency of the pulse width modulated signal driving the switches in the inverter's main power conversion stages. By varying these control signals in a unique pattern, the pattern can be transmitted as a change in the fairly high frequency noise coupled from the inverter throughout the modules of the array. A safety shutdown device, located in the field, can measure these current and/or voltage differences and reconstruct a shutdown, startup, or heartbeat signal, and take the appropriate action to enable/disable the array, the subset of the array, or the module under its control.

In embodiments, circuitry 110 can detect the normal operation of the inverter, including the current drawn during normal operation or small variations in the current due to MPPT or the inverter's tracking of the AC power grid frequency. Circuitry 110 can detect current with a current-sensing circuit or by inferring the current, or a change in current, from the voltage across the module or part of the module. Accordingly, circuitry 110 likewise can detect variations in the normal operation of the inverter in embodiments in which the heartbeat indication is a ripple or other variation to the normal operation.

As another example, time-varying light can be applied to the module's cells causing a change in the voltage or current measured by sensing circuitry in the module such that the indication can be received in the form of the change in voltage or current. Another example is a vibration transmitted through the module's mounting frame and detected by a sensing device, such as sensor 150.

In some embodiments, indication 142, such as a heartbeat indication, can be sent to all modules in the array, a subset of the modules, or to a single module. In some embodiments, some combination of local and external controllers can be used to engage and disengage the modules. For instance, determination of whether to enable or disable a module can be performed by a local controller based on an indication provided by a central controller. In some embodiments, controllers can coordinate with one another such that enabling or disabling is consistent in the array. For example, if a single local controller missed an indication to shut down, the other local controllers can share the shutdown signal with that single local controller to help ensure shutdown takes place. Note that such coordination need not take place for an entire array. For example, in some embodiments, system level coordination can refer to a system of PV modules coupled to some downstream hardware, such as an inverter, combiner box, etc.

In some embodiments, inverters are powered solely by the PV array and cannot send an enable indication to the modules before some or all of the modules become enabled. In such embodiments, a separate startup circuit can be used to send an enable indication to one or more modules in the array to become enabled so that the inverter can begin operating. The startup circuit can be built into the inverter enclosure but can be separate from the inverter's power production circuitry. In one embodiment, the startup circuit can use the AC power grid connection at the inverter's output as a power source. In some embodiments, the startup circuit can send the initial startup indication and the heartbeat indication during normal operation, or it just can send the startup indication before the inverter's normal operations.

As one concrete example of the startup sequence in which the startup circuit sends the initial startup indication and the inverter sends the normal operation heartbeat indication, the sequence can be as follows. First, the inverter can be unpowered and the modules disabled, but the startup circuit itself can be powered. The startup circuit can send a startup indication, which can be the same as or different than the heartbeat indication. The PV modules and respective circuitry 110 can receive and detect the heartbeat indication. In response to receiving and detecting the heartbeat indication, circuitry 110 can determine to enable and enable the PV modules. The inverter can begin normal operation and commence sending the period heartbeat indication to the various circuitry 110 and the startup circuitry can stop sending the startup indication. Circuitry 110 can then detect the inverter's heartbeat indication and/or detect its absence after a period of time and make a determination whether to enable or disable its associated PV module(s) or keep them in the current enabled or disabled state.

In some embodiments, circuitry 110 can lose power when the module is insufficiently illuminated unless its power supply obtains power from a source other than the PV module, such as the AC grid. Circuitry 110 can turn on around sunrise and turn off around sunset so the module is in a well-defined state when circuitry 110 is first powered each day. Circuitry 110 can reset due to loss of power if external influences, such as array current, cause the power supply to be unable to operate due to the voltage across the PV module. When a load is connected to the array, such as when a DC disconnect switch on the inverter is closed, a large current can flow from the PV modules, which can cause circuitry 110 on one or more modules to reset. In such a circumstance, the PV module can repeatedly reset while, for example, input capacitors on the inverter charge. Circuitry 110 can detect such a condition through measurements (e.g., 142b) of the module or by measuring the time that the power supply was unable to operate, and can modify its behavior while the condition persists. During normal operation, circuitry 110 can remain powered and the module would remain enabled.

Figure 3:
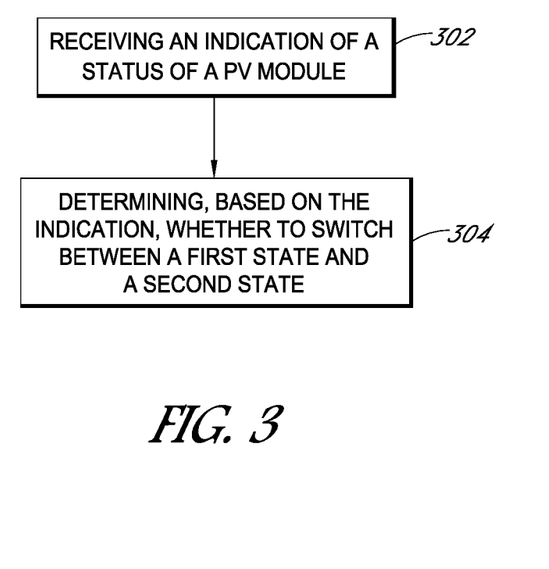
FIG. 3 is a flowchart illustrating an example method of performing shut down or start up of a photovoltaic module, according to some embodiments.

Turning now to FIG. 3, a flow chart illustrating a method for enabling or disabling PV modules is shown, according to some embodiments. In various embodiments, the method of FIG. 3 may include additional (or fewer) blocks than illustrated.

At 302, an indication of a status of a PV module or modules can be received by circuitry associated with the PV module(s), such as circuitry 110. As described herein, the indication can be a shutdown indication/command, a periodic heartbeat indication, a startup indication, an indication of a measurement at or near the module (e.g., voltage, current, temperature, vibration), among other examples. Also as described herein, the indication can be received from a local source, such as from a sensor at the PV module, or from a remote source, such as from an inverter, combiner box, or some other component (e.g., a manual "stop" button).

In various embodiments, the indication can be received by the circuitry over the power line (e.g., PLC), wirelessly (e.g., ZigBee, mesh network), or otherwise.

Circuitry can be shared among multiple PV modules or can be distributed such that each PV module is associated with corresponding circuitry. One example of the distributed circuitry can be in the form of a voltage limiting device in an enclosure (e.g., junction box) coupled mechanically to the back of the PV module or within the laminate of the PV module.

At 304, whether to switch between a first state and a second state can be determined based on the received indication.

In one embodiment, based on the determination at 304, a controller of the circuitry can either directly, or through one or more drivers, enable or disable the switch(es) to disable or enable the PV module, respectively. In one embodiment, by enabling the switch(es), the parallel path can be enabled such that the solar cells corresponding to the enabled switch(es) are no longer contributing voltage to the PV module's output.

As one example, if the received indication is a shutdown indication, at 304, the circuitry can determine to disable the PV module. As another example, if the received indication is a heartbeat indication, at 304, the circuitry can determine to keep operating the PV in the enabled state. Furthering the heartbeat example, the circuitry can similarly determine at 304 that no heartbeat indication has been received for a threshold amount of time, and determine to disable the PV module. In one embodiment, a timer can be received by circuitry 110 and it can reset each time the heartbeat indication is received. If the timer reaches the threshold amount (e.g., 5 seconds, 10 seconds, 20 seconds), then circuitry can determine to disable the PV module. As yet another example, if the indication is a startup indication, the circuitry can determine at 304 to enable the PV module based on receiving the startup indication.

As described herein, the heartbeat indication can be provided in a variety of manners. For example, a component, such as an inverter, can provide the heartbeat indication to the circuitry by applying a voltage based on a modified modulation scheme to the PV modules. In one embodiment, the inverter can produce ripples in the current that are detectable by circuitry 110. The ripples could be produced in a complicated pattern that is unlikely to naturally occur and therefore be easy for circuitry 110 to identify as a heartbeat indication. In one embodiment, the inverter can provide the heartbeat indication as a pseudo random digital code.

In various embodiments, the heartbeat can be provided multiple times within the threshold time period to help ensure that the circuitry can receive the heartbeat within the threshold time period even if one of the heartbeats is not properly received by the circuitry. As one particular example, in one embodiment, the heartbeat indication can be provided 2-3 times within a 10 second period.

As another example of how the heartbeat indication can be provided, in one embodiment, the magnitude of MPPT steps for MPPT tracking can be modified. For instance, in one embodiment, during normal operation the inverter can adjust the amount of power it is drawing by changing the string current (and voltage) up or down in small steps every few seconds. In one embodiment, a more complicated and recognizable pattern of MPPT step changing can be used (e.g., go up for 1 second, down for 2 seconds, etc.) such that circuitry can detect that the MPPT pattern is indicative of normal operation of the inverter and therefore the circuitry can determine to keep the PV module enabled.

Other examples of providing and receiving the heartbeat indication also exist as described throughout the specification.

The disclosed structures and techniques can provide for safety shutdown and/or startup in a safe and orderly manner to help facilitate installation, maintenance, and emergency work at or nearby an array while inhibiting downtime and unnecessary shutting down of the array.

Figure 4:
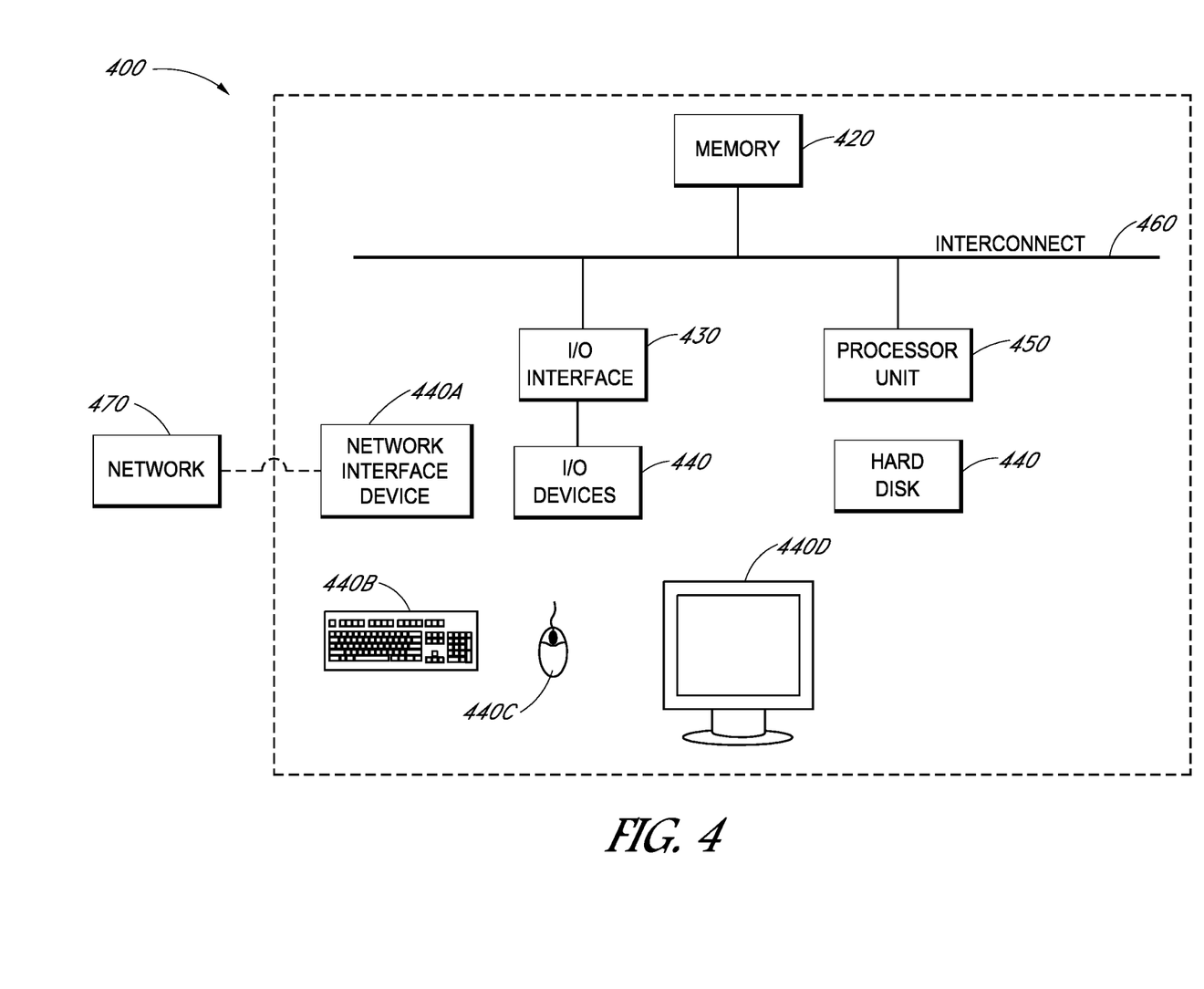
FIG. 4 is a block diagram of an example computer system configured to implement one or more of the disclosed techniques, according to some embodiments.

Turning now to FIG. 4, example circuitry 400 configured to implement one or more portions of the disclosed techniques is shown. Circuitry 400 can be any suitable device, including, but not limited to module-level electronics, etc.

As shown, circuitry 400 can include processor unit 450, memory 420, input/output (I/O) interface 430 coupled via an interconnect 460 (e.g., a system bus). I/O interface 430 can be coupled to one or more I/O devices 440.

In various embodiments, processor unit 450 can include one or more processors. In some embodiments, processor unit 450 can include one or more coprocessor units. In some embodiments, multiple instances of processor unit 450 can be coupled to interconnect 460. Processor unit 450 (or each processor within 450) can contain a cache or other form of on-board memory. In general circuitry 400 is not limited to any particular type of processor unit or processor subsystem.

Memory 420 can be usable by processor unit 450 (e.g., to store instructions executable by and data used by unit 450). Memory 420 may be implemented by any suitable type of physical memory media, including hard disk storage, floppy disk storage, removable disk storage, flash memory, random access memory (RAM-SRAM, EDO RAM, SDRAM, DDR SDRAM, Rambus® RAM, etc.), ROM (PROM, EEPROM, etc.), and so on. Memory 420 may consist solely of volatile memory in one embodiment.

Memory in circuitry 400 is not necessarily limited to memory 420. Rather, circuitry 400 may be said to have a "memory subsystem" that includes various types/locations of memory. For example, the memory subsystem of circuitry 400 may, in one embodiment, include memory 420, cache memory in processor unit 450, storage on I/O devices 440 (e.g., a hard drive, storage array, etc.), and so on. Accordingly, the phrase "memory subsystem" is representative of various types of possible memory media within circuitry 400. The memory subsystem of computer 400 may store program instructions executable by processor unit 450, including program instructions executable to implement the various techniques disclosed herein.

I/O interface 430 may represent one or more interfaces and may be any of various types of interfaces configured to couple to and communicate with other devices (e.g., to receive an indication of the status of the PV system from an inverter, to communicate module status to an inverter or other remote device), according to various embodiments. In one embodiment, I/O interface 430 is a bridge chip from a front-side to one or more back-side buses. I/O interface 430 may be coupled to one or more I/O devices 440 via one or more corresponding buses or other interfaces. Examples of I/O devices include storage devices (hard disk (e.g., 440E), optical drive, removable flash drive, storage array, SAN, or an associated controller), network interface devices (e.g., 440A, which may couple to a local or wide-area network), user interface devices (e.g., mouse 440B, keyboard 440C, display monitor 440D) or other devices (e.g., graphics, sound, etc.). In one embodiment, circuitry 400 can be coupled to a network 470 via a network interface device 440A. I/O devices 440 are not limited to the examples listed above. All depicted I/O devices 440 need not be present in all embodiments of circuitry 400.

Circuitry 400 (or multiple instances of circuitry 400) may be used to implement the various techniques described herein. Articles of manufacture that store instructions (and, optionally, data) executable by a computer system to implement various techniques disclosed herein are also contemplated. These articles of manufacture include tangible computer-readable memory media. The contemplated tangible computer-readable memory media include portions of the memory subsystem of circuitry 400 (without limitation SDRAM, DDR SDRAM, RDRAM, SRAM, flash memory, and various types of ROM, etc.), as well as storage media or memory media such as magnetic (e.g., disk) or optical media (e.g., CD, DVD, and related technologies, etc.). The tangible computer-readable memory media may be either volatile or nonvolatile memory.

Various components of the disclosed circuitry and/or one or more portions of the disclosed techniques can be implemented by a processor unit executing program instructions stored on a memory. In various embodiments, the processor unit can include one or more processors or cores. The processor unit can contain a cache or other form of on-board memory. The memory is usable by the processor unit (e.g., to store instructions executable by and data used by the processor unit). The memory can be implemented by any suitable type of physical memory media, including hard disk storage, floppy disk storage, removable disk storage, flash memory, random access memory (RAM-SRAM, EDO RAM, SDRAM, DDR SDRAM, Rambus® RAM, etc.), ROM (PROM, EEPROM, etc.), and so on. The memory can consist solely of volatile memory in one embodiment.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A photovoltaic (PV) system, comprising:
an inverter configured to transmit a heartbeat indication of a status of the PV system, wherein the heartbeat indication is generated from the inverter by altering a normal operation of the inverter;
a plurality of PV cells configured to provide direct current (DC) power to the inverter; and
a junction box coupled to the plurality of PV cells, the junction box comprising circuitry associated with the plurality of PV cells, wherein the circuitry comprises one or more switches, and wherein the circuitry is configured to:
determine whether the heartbeat indication of the status of the PV system has been received, and
in response to receiving the heartbeat indication of the status of the PV system, control the one or more switches to switch between a first state in which the plurality of PV cells are enabled and a second state in which the plurality of PV cells are disabled.

2. The PV system of claim 1, wherein the circuitry comprises a respective voltage control and limiting device coupled to each of the plurality of PV cells, wherein each respective voltage control and limiting device is configured to, in response to receiving the heartbeat indication, control the one or more switches to switch between the first state in which a corresponding one of the plurality of PV cells is enabled and a second state in which the corresponding one of the plurality of PV cells is disabled.

3. The PV system of claim 1, wherein in response to receiving the heartbeat indication, the circuitry is configured to control the one or more switches to switch to the first state.

4. The PV system of claim 1, wherein the circuitry is further configured to: determine that the heartbeat indication has not been received within a threshold amount of time, and in response to determining that the heartbeat indication has not been received within the threshold amount of time, control the one or more switches to switch to the second state.

5. The PV system of claim 1, wherein to provide the heartbeat indication, the inverter is configured to modify a modulation scheme to apply a voltage, based on the modified modulation scheme, to the plurality of PV cells.

6. The PV system of claim 1, further comprising a startup circuity configured to provide a startup indication to the circuitry.

7. The PV system of claim 1, wherein the plurality of PV cells comprises a plurality of solar cell strings, wherein each of the plurality of solar cell strings is connected to a respective independently controlled switch of the one or more switches, and wherein at least an independently controlled switch is located at a negative line of the respectively connected solar cell string.

8. The PV system of claim 1, wherein the circuitry is further configured to:
receive, from the inverter, a startup indication.

9. The PV system of claim 1, wherein the circuitry is further configured to:
receive, from the inverter, a shutdown indication; and
in response to receiving the shutdown indication, control the one or more switches to switch to the second state in which the plurality of PV cells are disabled.

10. A method for a photovoltaic (PV) system, comprising:
determining, by circuitry in a junction box, whether a heartbeat indication of a status of the PV system has been received, wherein:
the heartbeat indication is generated from an inverter by altering a normal operation of the inverter, the circuitry is associated with a plurality of PV cells that are configured to provide direct current (DC) power to the inverter, and the circuitry comprises one or more switches, and in response to receiving the heartbeat indication of the status of the PV system, controlling the one or more switches to switch between a first state in which the plurality of PV cells are enabled and a second state in which the plurality of PV cells are disabled.

11. The method of claim 10, further comprising:
in response to receiving the heartbeat indication, controlling the one or more switches to switch to the first state.

12. The method of claim 10, further comprising:
determining that the heartbeat indication has not been received within a threshold amount of time, and
in response to determining that the heartbeat indication has not been received within the threshold amount of time, controlling the one or more switches to switch to the second state.

13. The method of claim 10, further comprising:
modifying a modulation scheme to apply a voltage, based on the modified modulation scheme, to the plurality of PV cells.

14. The method of claim 10, further comprising:
receiving, from the inverter, a startup indication.

15. The method of claim 10, further comprising:
receiving, from the inverter, a shutdown indication; and
in response to receiving the shutdown indication, controlling the one or more switches to switch to the second state in which the plurality of PV cells are disabled.

16. The method of claim 10, wherein the plurality of PV cells comprises a plurality of solar cell strings, wherein each of the plurality of solar cell strings is connected to a respective independently controlled switch of the one or more switches, and wherein at least an independently controlled switch is located at a negative line of the corresponding solar cell string.

* * * * *